(12) United States Patent
Kebernik et al.

(10) Patent No.: US 11,378,289 B2
(45) Date of Patent: Jul. 5, 2022

(54) ENERGY EXCHANGE APPARATUS FOR SENSIBLE AND LATENT HEAT

(71) Applicant: Tempeff North America Ltd., Winnipeg (CA)

(72) Inventors: Andy Kebernik, Winnipeg (CA); Jeffrey Allen Goertzen, Winnipeg (CA); Kenneth Smith, Winnipeg (CA); G. Dean Scheurich, Winnipeg (CA)

(73) Assignee: Tempeff Inc., Winnipeg (CA)

( * ) Notice: Subject to any disclaimer, the term of this patent is extended or adjusted under 35 U.S.C. 154(b) by 97 days.

(21) Appl. No.: 16/811,440

(22) Filed: Mar. 6, 2020

(65) Prior Publication Data

US 2020/0326083 A1    Oct. 15, 2020

Related U.S. Application Data

(60) Provisional application No. 62/859,841, filed on Jun. 11, 2019, provisional application No. 62/831,426, filed on Apr. 9, 2019.

(51) Int. Cl.
*F24F 3/147* (2006.01)
*F24F 3/14* (2006.01)
*F24F 12/00* (2006.01)
*F28D 21/00* (2006.01)
*F24F 11/43* (2018.01)

(52) U.S. Cl.
CPC ............ *F24F 3/147* (2013.01); *F24F 3/1429* (2013.01); *F24F 11/43* (2018.01); *F24F 12/001* (2013.01); *F28D 21/0015* (2013.01); *F24F 2012/008* (2013.01)

(58) Field of Classification Search
CPC .......... F24F 3/147; F24F 3/1429; F24F 11/43; F24F 12/001; F24F 2003/1458; F24F 2012/008; F28D 9/0025; F28D 17/02; F28D 21/0015; F28D 2020/0008; Y02B 30/56
See application file for complete search history.

(56) References Cited

U.S. PATENT DOCUMENTS

| 3,225,819 | A | * | 12/1965 | Stevens | F24F 12/001 165/200 |
| 5,050,667 | A | * | 9/1991 | Berner | F24F 12/001 165/4 |
| 5,439,048 | A | * | 8/1995 | Osman | F28D 17/00 165/4 |

(Continued)

*Primary Examiner* — Eric S Ruppert
*Assistant Examiner* — Hans R Weiland
(74) *Attorney, Agent, or Firm* — Adrian D. Battison; Ade & Company Inc.; Ryan W. Dupuis

(57) ABSTRACT

An apparatus is provided and arranged with an air control system to alternately direct a first and a second airflow to a first and a second energy-absorbing body in order to achieve a heat and moisture transfer between the two airflows. The energy exchange bodies alternate between recovery and release modes such that when one energy exchange body is in the release mode the other is in the recovery mode. Each of the first and second energy absorbing bodies is divided into a first latent energy recovery portion which includes a moisture absorbent material so that it is arranged to absorb latent energy and a second sensible energy recovery portion which is substantially free from moisture absorbent material so as to absorb primarily sensible energy.

20 Claims, 12 Drawing Sheets

(56) References Cited

U.S. PATENT DOCUMENTS

| | | | | |
|---|---|---|---|---|
| 5,771,707 A | * | 6/1998 | Lagace | F24F 3/147 165/8 |
| 6,062,296 A | * | 5/2000 | Broberg | F24F 3/1423 165/6 |
| 6,199,388 B1 | * | 3/2001 | Fischer, Jr. | F24F 3/1411 62/90 |
| 6,450,244 B1 | * | 9/2002 | Bassilakis | F28D 17/02 165/10 |
| 6,675,601 B2 | * | 1/2004 | Ebara | F24F 3/1423 62/271 |
| 7,059,385 B2 | * | 6/2006 | Moilala | F24F 12/001 165/4 |
| 7,441,586 B2 | * | 10/2008 | Chung | F24F 12/001 165/4 |
| 2004/0134211 A1 | * | 7/2004 | Lee | F24F 3/1423 62/271 |
| 2004/0250557 A1 | * | 12/2004 | Yabu | F24F 3/1423 62/94 |
| 2011/0036541 A1 | * | 2/2011 | Takada | F24F 12/006 165/59 |
| 2017/0045257 A1 | * | 2/2017 | Moffitt | F24F 3/147 |

* cited by examiner

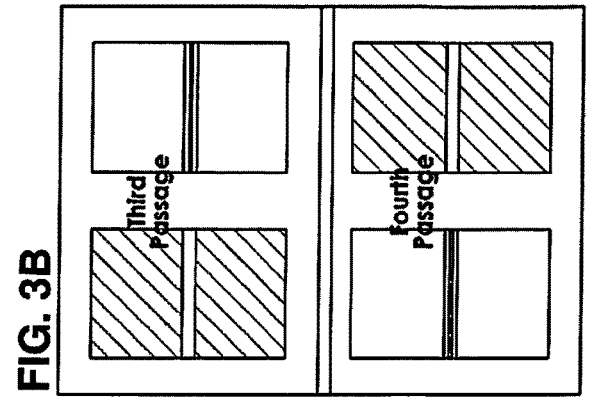
FIG. 3B
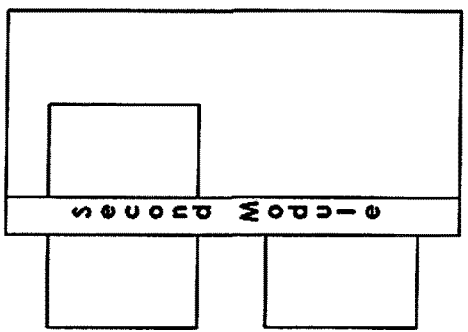
FIG. 2
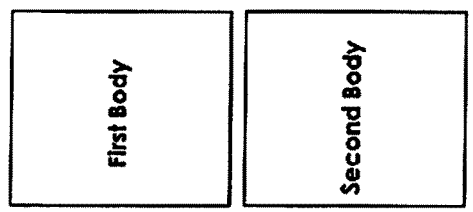
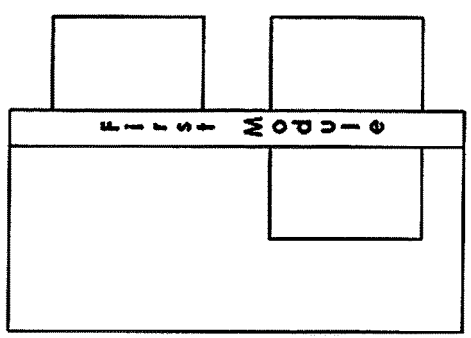
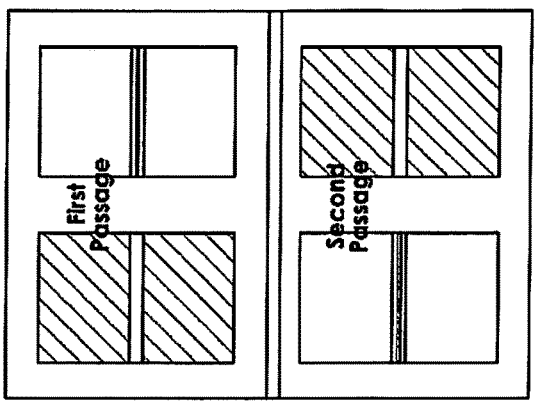
FIG. 3A

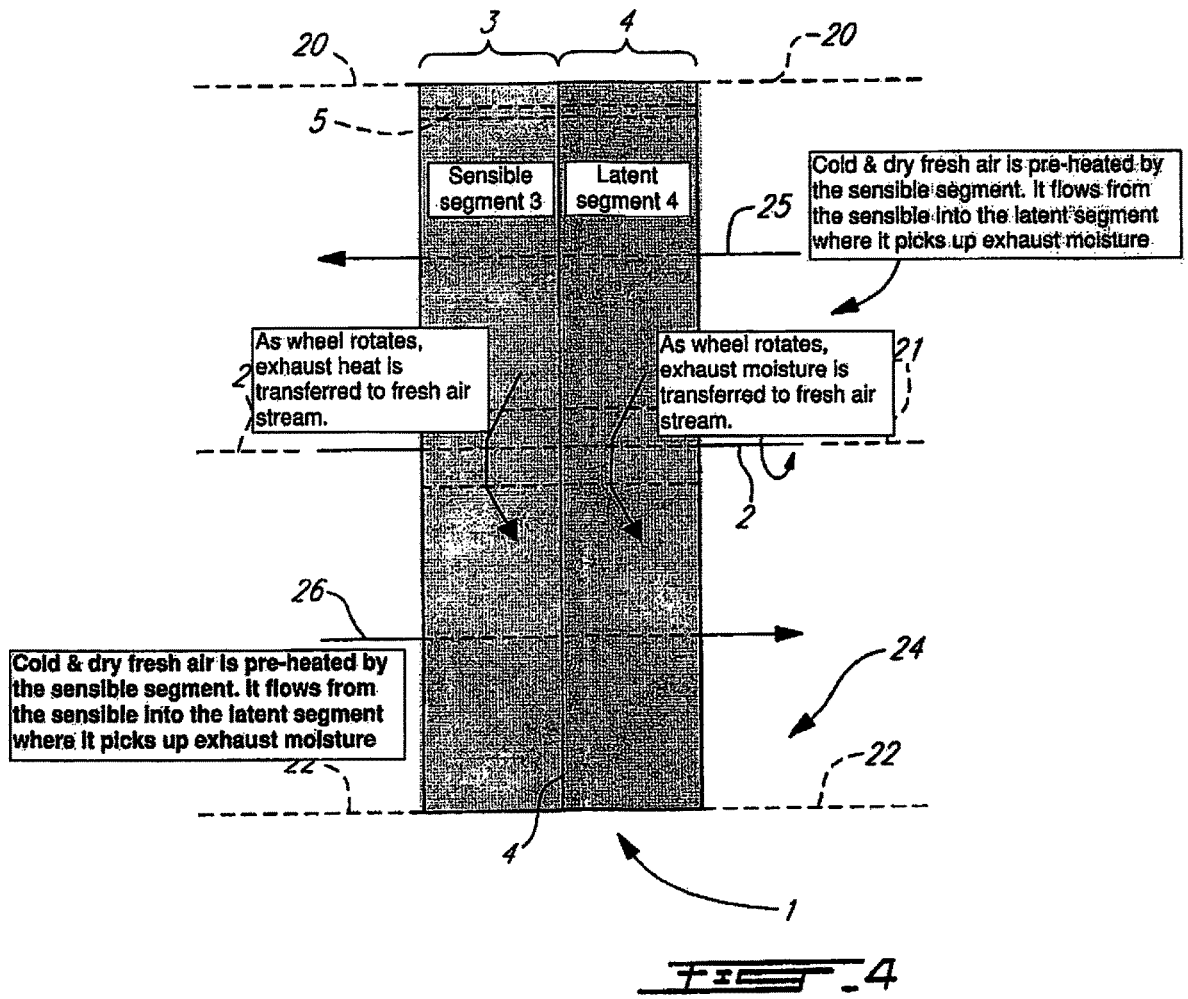

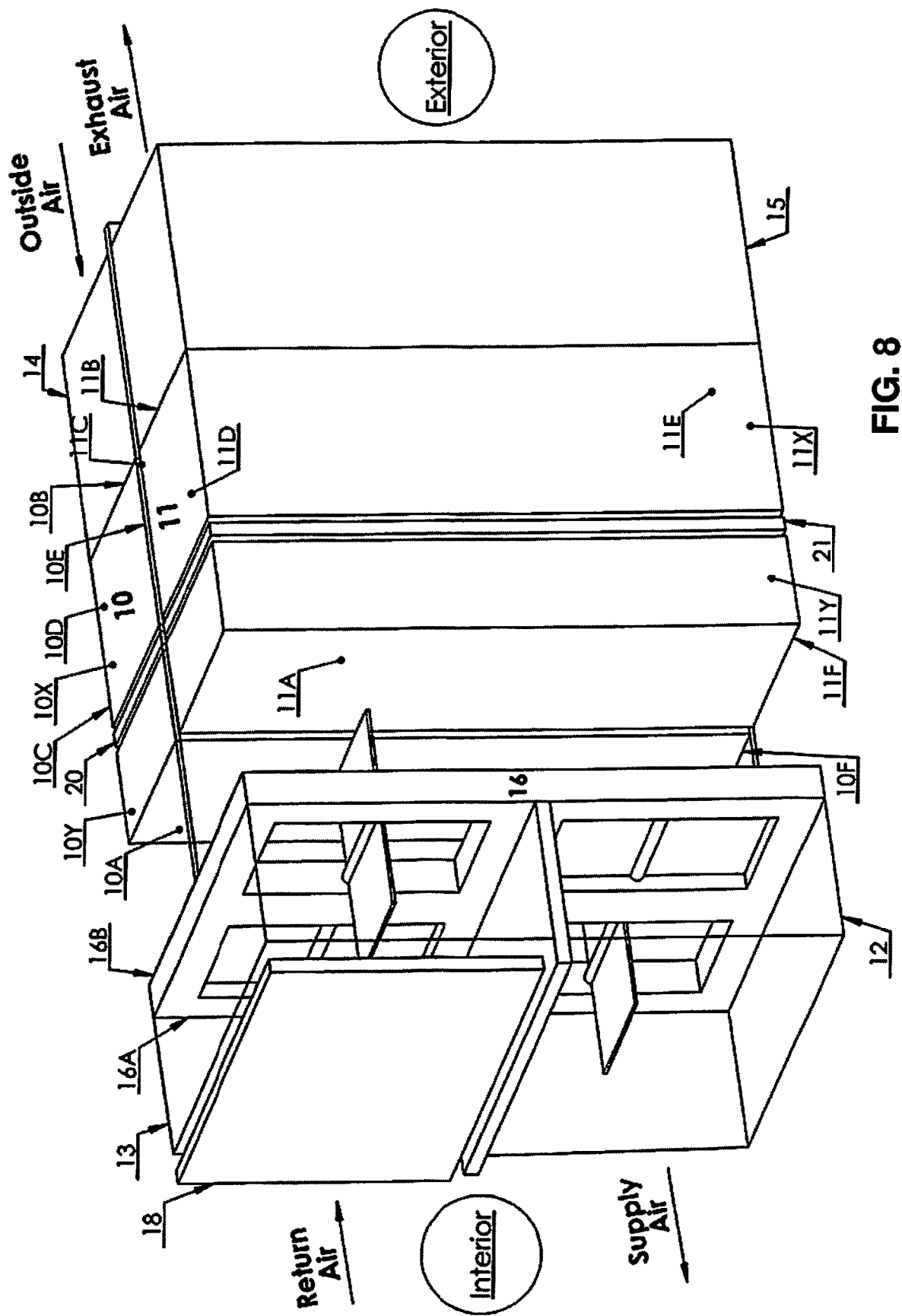

ENERGY EXCHANGE APPARATUS FOR SENSIBLE AND LATENT HEAT

This application claims the benefit under 35 USC 1190 of Provisional Applications 62/859,841 filed Jun. 11, 2019 and 62/831,426 filed Apr. 9, 2019 the disclosures of which are incorporated herein by reference.

The present invention relates to an energy exchange device to be mounted in relation to a structure such as a building between air exterior to the structure and air interior to the structure which extracts both sensible and latent energy from the air flows. As is well known, sensible heat is the energy related to the temperature change of the air flow and latent heat is the energy related to change in moisture content of the air flow. Typically the moisture is collected in energy absorbing bodies from high humidity air by a moisture absorbent material such as a desiccant and then is released to low humidity air passing through the bodies.

The arrangement herein is used with an apparatus adapted to alternately direct a first and a second airflow to a first and a second energy-absorbing body in order to achieve energy transfer between the two airflows. The energy exchange bodies alternate between recovery and release modes such that when one energy exchange body is in the release mode the other is in the recovery mode.

Arrangements of this type are shown in Canadian Patent 2726001 (Stenfors) assigned to the present applicant first published Jul. 1, 2010. Similar arrangements are shown in EP 024269 (Stenfors) published February 1981 and U.S. Pat. No. 6,450,244 (Bassilakis) issued February September 2002. The disclosures of these documents are hereby incorporated by reference or may be referenced for further details not described herein.

The arrangements described above thus provide a ventilation apparatus for connection between an exterior and an interior of a structure such as typically a building. The system is designed to operate:

in a cooling operation, when air in the exterior is hotter and/or more humid than air in the interior, energy is extracted from an exterior air flow passing from the exterior to the interior to cool and/or dehumidify the exterior air flow passing to the interior; and in a heating operation, when the exterior air is cooler and/or dryer than the interior air, energy is extracted from an interior air flow passing to the exterior from the interior to heat and/or humidify the exterior air flow passing to the interior.

Thus the arrangement of the present invention is intended to be mounted in a structure having an interior air and exterior air stream, typically a building where the exterior air can be warmer and more humid than the interior during summer and can be colder and drier during the winter.

The apparatus includes a first energy absorbing body and a second energy absorbing body;

a first airflow passageway for connection to the interior of the building so that an airflow can pass therethrough to introduce exterior air into the building;

a second airflow passageway for connection to the interior of the building so that an airflow can pass therethrough to extract interior air from the building;

a third airflow passageway for connection to the exterior of the building so that an airflow can pass therethrough to pull exterior air into the building; and a fourth airflow passageway for connection to the exterior of the building so that an airflow can pass therethrough to expel interior air out of the building.

The first and second energy absorbing bodies are arranged so as to:

a) transfer thermal energy to the energy absorbing body from air passing through the energy absorbing body when a temperature and/or humidity of the air is higher than the energy absorbing body so as to store hot thermal energy in the energy absorbing body; and b) transfer thermal energy from the energy absorbing body to the air passing through the energy absorbing body when a temperature and/or humidity of the air is lower than the energy absorbing body so as to store cold thermal energy in the energy absorbing body.

An air control system is provided to switch the air flows between the first and second energy absorbing bodies so that in the cooling operation in a first mode the interior air flow passes through the first energy absorbing body to the exterior to store cold thermal energy in the first energy absorbing body while the exterior air flow does not pass through the first energy absorbing body but instead it passes through the second energy absorbing body to the interior and in a second mode the interior air flow passes through the second energy absorbing body to the exterior to store cold thermal energy in the second energy absorbing body while the exterior air flow does not pass through the second energy absorbing body but instead passes through the first energy absorbing body to the interior while being cooled and/or dehumidified by the cold thermal energy stored in the first energy absorbing body which has been cooled and/or dehumidified in the first mode.

The air control system also operates in the heating operation to switch the air flows between the first and second energy absorbing bodies so that in a first mode of the heating operation interior air flow passes through the first energy absorbing body to the exterior to store hot thermal energy in the first energy absorbing body while the exterior air flow does not pass through the first energy absorbing body but instead passes through the second energy absorbing body to the interior; and in a second mode of the heating operation the interior air flow passes through the second energy absorbing body to the exterior to store hot thermal energy in the second energy absorbing body while the exterior air flow does not pass through the second energy absorbing body but instead passes through the first energy absorbing body to the interior while being heated and/or humidified by the hot thermal energy stored in first energy absorbing body which has been heated and/or humidified in the first mode.

A further arrangement is shown in U.S. Pat. No. 8,522,859 (Moilala) issued Sep. 3, 2013 which shows the use of a phase change material within the bodies to provide absorption of additional energy.

SUMMARY OF THE INVENTION

The present invention is concerned with the provision of a moisture absorbent material in the energy absorbing body so that both sensible and latent energy are absorbed and so that moisture is transferred between the interior and exterior air flow in both heating and cooling operation.

According to the present invention there is provided a ventilation apparatus for connection between an exterior and an interior of a structure, such as a building or other construction where air of different temperatures and humidities are located on the interior and exterior, where the apparatus is arranged to operate:

in a cooling operation, when air in the exterior is hotter and more humid than air in the interior, heat and moisture is extracted from an exterior air flow passing from the exterior to the interior to cool and dehumidify the exterior air flow passing to the interior; and in a heating operation, when the exterior air is cooler and drier than the interior air, heat and moisture is extracted from an interior air flow passing to the exterior from the interior to heat and humidify the exterior air flow passing to the interior;

the apparatus comprising:

a first energy absorbing body and a second energy absorbing body;

a first airflow passageway for connection to the interior of the building so that an airflow can pass therethrough to introduce exterior air into the building;

a second airflow passageway for connection to the interior of the building so that an airflow can pass therethrough to extract interior air from the building;

a third airflow passageway for connection to the exterior of the building so that an airflow can pass therethrough to pull exterior air into the building; and a fourth airflow passageway for connection to the exterior of the building so that an airflow can pass therethrough to expel interior air out of the building;

the first and second energy absorbing bodies being arranged so as to:
a) transfer hot thermal energy to the energy absorbing body from air passing through the energy absorbing body when a temperature and/or humidity of the air is higher than the energy absorbing body so as to store hot thermal energy in the energy absorbing body; and
b) transfer cold thermal energy to the energy absorbing body from air passing through the energy absorbing body when a temperature and/or humidity of the air is lower than the energy absorbing body so as to store cold thermal energy in the energy absorbing body; and an air control system is provided to switch the air flows between the first and second energy absorbing bodies so that:

in the cooling operation in a first mode the interior air flow passes through the first energy absorbing body to the exterior to store cold thermal energy in the first energy absorbing body while the exterior air flow does not pass through the first energy absorbing body but instead it passes through the second energy absorbing body to the interior and in a second mode the interior air flow passes through the second energy absorbing body to the exterior to store cold thermal energy in the second energy absorbing body while the exterior air flow does not pass through the second energy absorbing body but instead passes through the first energy absorbing body to the interior while being cooled and/or dehumidified by the cold thermal energy stored in the first energy absorbing body which has been cooled and/or dehumidified in the first mode;

in the heating operation the air flows between the first and second energy absorbing bodies so that in a first mode of the heating operation interior air flow passes through the first energy absorbing body to the exterior to store hot thermal energy in the first energy absorbing body while the exterior air flow does not pass through the first energy absorbing body but instead passes through the second energy absorbing body to the interior; and in a second mode of the heating operation the interior air flow passes through the second energy absorbing body to the exterior to store hot thermal energy in the second energy absorbing body while the exterior air flow does not pass through the second energy absorbing body but instead passes through the first energy absorbing body to the interior while being heated and/or humidified by the hot thermal energy stored in first energy absorbing body which has been heated and/or humidified in the first mode;

wherein each of the first and second energy absorbing bodies is divided into a first latent energy recovery portion which includes a moisture absorbent material so that it is arranged to absorb latent energy and a second sensible energy recovery portion which is substantially free from moisture absorbent material so as to absorb primarily sensible energy.

Preferably the second portion contains no moisture absorbent material.

Preferably the first and second portions are separate components.

Preferably the first and second portions are arranged directly end to end.

Preferably the first and second portions have a common face therebetween of common dimensions through which air departing one portion enters the other portion.

Preferably the air from the second and third airflow passageway is filtered upstream of the first portion of each energy absorbing body to prevent erosion, contamination, and blockage of the moisture absorbent material. The exterior airflow pulled from the exterior is filtered before entering either one of the energy adsorbing body. Similarly, the interior air from the building is filtered before entering the first portion and being expelled to the exterior.

Preferably arrangements with air reversal in the third and fourth passageway are fitted with a bi-directional air filter between the first and second portion of each energy absorbing body to remove dust particles and contaminants from the exterior air flow before entering the first portion.

Preferably the first portion comprises sheets of a supporting material coated on both surfaces by a moisture absorbent material and the second portion is formed of sheets of a supporting material which carries no moisture absorbent material.

Preferably the sheets are formed of aluminum.

Preferably the sheets of the first portion are arranged to define passages which are smaller than those of the second portion.

Preferably first portion has a volume which is smaller than that of the second portion.

Preferably first portion has a cross-sectional area which is equal to that of the second portion and a path length which is shorter.

Preferably in the heating operation in the first mode when the cold exterior air flow which is freezing passes through the second energy absorbing body to the interior and in a second mode the cold exterior air flow passes through the first energy absorbing body to the interior while being heated and/or humidified by the hot thermal energy stored in first energy absorbing body which has been heated and/or humidified in the first mode, the freezing exterior air first passes through the second sensible energy recovery portion and is heated and/or humidified by that second portion before it reaches the separate first latent energy recovery portion. Because the air is now heated before it reaches the first portion, it can pick up more moisture to provide more humidity to the building.

Preferably in the cooling operation in the first mode when the exterior air flow which is very hot and humid passes through the second energy absorbing body to the interior and in the second mode when the hot and humid exterior air flow passes through the first energy absorbing body to the interior while being cooled and/or dehumidified by the cold thermal energy stored in first energy absorbing body which has been cooled and/or humidified in the first mode, the hot and humid exterior air first passes through the second sensible energy recovery portion and is cooled by that second portion before it reaches the separate first latent energy recovery portion sufficiently to increase relative humidity of the air flow which improves absorption of the moisture in the first portion.

The absorbent material in the first portion can be one of many different types but one particular material which is preferred is a 3Angstrom molecular sieve ideal for fast, frequent moisture absorption and release cycles. Others can be a molecular sieve with a larger pore diameter, silica gel, activated alumina, or ion-exchange resin.

The coating thickness of the absorbent material is preferably in the range of 0.5 to 20 lb/ream.

The transverse dimensions of the channels of the first portion through which the air passes are approximately 0.04 to 0.2 inch in height with a pitch of 0.08 to 0.35 inch. The length of the channel from a front face of the first portion to a rear face of the body is in the range of 4 to 20 inches. Using these dimensions, the amount of moisture which can be extracted from the air is in the range 15 to 85% and this will reduce the humidity by 5 to 60 grains/lb of dry air.

The arrangement of the second portion of the energy absorbing body which contains little moisture and uses much larger channels ensures that air from the exterior which is very cold down to −40 degrees F. is warmed by the second portion to at least 40 degrees F. before entering the first portion.

The cross sectional area of the channels of the second portion are typically in the range of 0.1 to 0.5 inch height with 0.75 to 2 inch pitch and thus much greater than those of the first portion.

The timing of the reversal in air flow through the bodies may be changed from winter season to summer season so that for example a typical reversal time of 1 minute used in winter is reduced in summer to prevent saturating the first latent energy recovery portion partway through a recovery period to achieve more efficient moisture transfer.

BRIEF DESCRIPTION OF THE DRAWINGS

The invention is now to be described as a number of non-limiting examples of the invention with reference to the attached drawings.

FIG. 2 is a top view of the ventilation device in FIG. 1.

FIGS. 3A and 3B are end elevational views of the ventilation device in FIG. 1.

FIGS. 4 to 7 are the same perspective view as shown in FIG. 1 arranged to show the different modes in the heating and cooling operations.

FIG. 8 shows an arrangement with a single air control system on the interior side of the energy absorbing body. Without a second air control system the overall size and weight is reduced and the system is easier to control. The challenge with this arrangement is filtering the reversing air flow in the third and fourth passageway.

DETAILED DESCRIPTION

Figure 1:
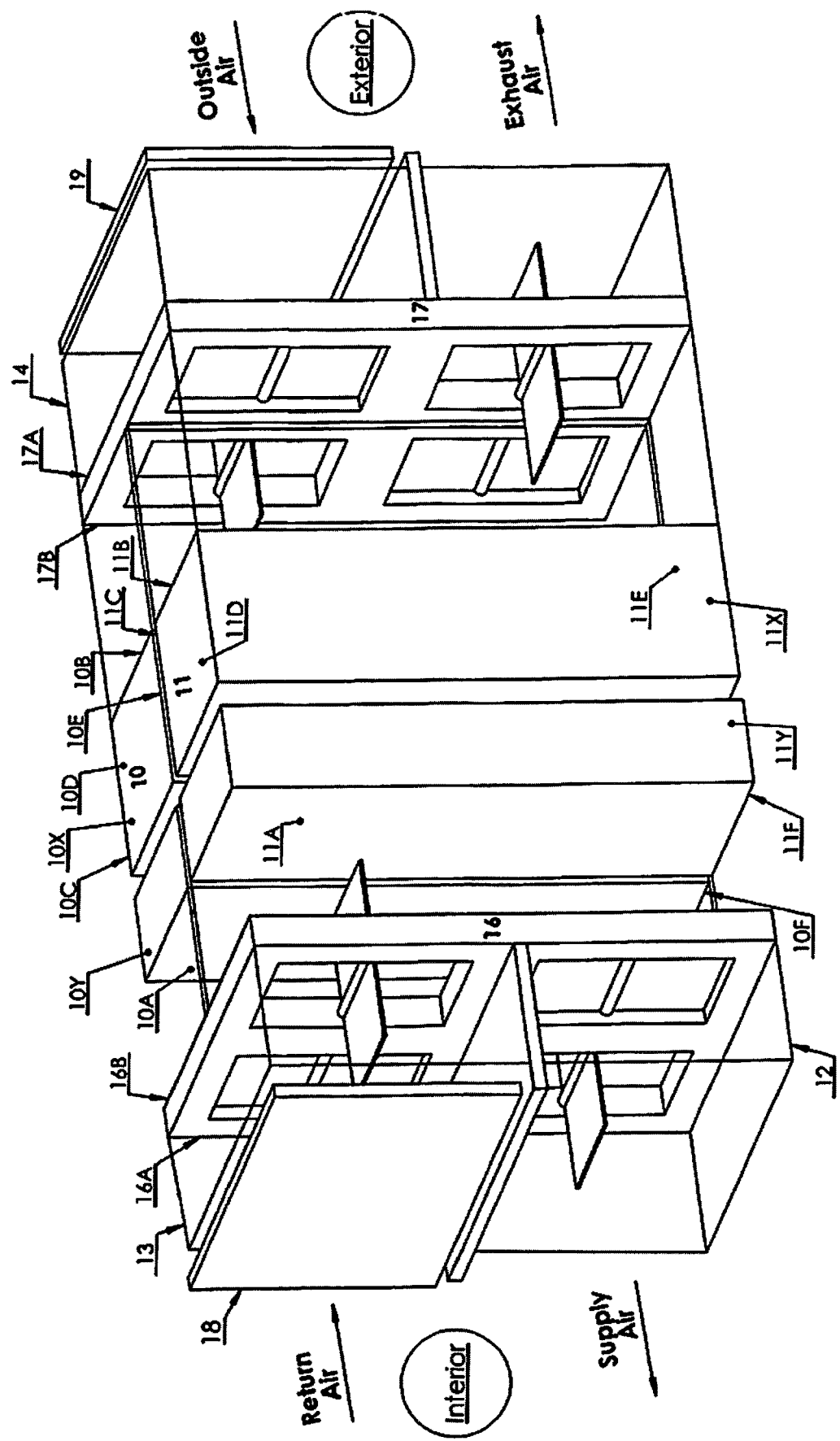
FIG. 1 is a perspective view of a ventilation device according to one example of the present invention, with parts of the housing cut open for visibility.

The energy exchanger shown in FIG. 1, provides a ventilation apparatus that has ducts attached to end faces of the energy exchanger that communicate with the exterior and interior of the building in which the installation occurs. The apparatus includes a first energy absorbing body 10 and a second energy absorbing body 11. first airflow passageway 12 is provided for connection to the interior of the building so that an airflow can pass therethrough to introduce exterior air into the building and a second airflow passageway 13 for connection to the interior of the building so that an airflow can pass therethrough to extract interior air from the building. A third airflow passageway 14 is provided for connection to the exterior of the building so that an airflow can pass therethrough to pull exterior air into the building fourth airflow passageway 15 for connection to the exterior of the building so that an airflow can pass therethrough to expel interior air out of the building.

The body 10 has air passage faces 10A, 10B, and four closed sides 10C, 10D, 10E, and 10F at the first vertical side, the top, the second vertical side and the bottom respectively The body 11 has air passage faces 11A, 11B, and four closed sides 11C, 11D, 11E, and 11F at the first vertical side, the top, the second vertical side and the bottom respectively The apparatus is a regenerative energy exchanger with two banks of aluminum cores that accumulate energy in two parallel air streams, while one bank of aluminum is being charged with the exhausted air the second bank is releasing its energy to the fresh air See bodies 10 and 11 where the side 10E of body 10 is immediately adjacent to and parallel to side 11C of body 11. See bodies 10 and 11 where the face 10A of body 10 is alongside face 11A of body 11 and where the face 10B of body 10 is alongside face 11B of body 11.

Passageways 14 and 15 are located at the end 17A of the module 17. The faces 10B and 11B are located at the second end 17B of the module 17

The modules 16 and 17 act as switches transferring air flow between the bodies 10 and 11 at both ends of the bodies so that the module 16 is at one end of the bodies and the module 17 at the other end. That is each module includes two upper valves with each communicating when open with a respective one of the two bodies and each module includes two lower valves again with each communicating when open with a respective one of the two bodies In a first mode of the cooling operation shown in FIG. 4 the interior air flow is switched by the first air control module to pass from the second airflow passageway through the first energy absorbing body and is switched by the second air control module to pass to the fourth airflow passageway to the exterior to store cold thermal energy in the first energy absorbing body while the exterior air flow does not pass through the first energy absorbing body but instead is passes through the third airflow passageway and is switched by the second air control module to pass through the second energy absorbing body and is switched by the first air control module to pass to the interior through the first airflow passageway.

Figure 5:
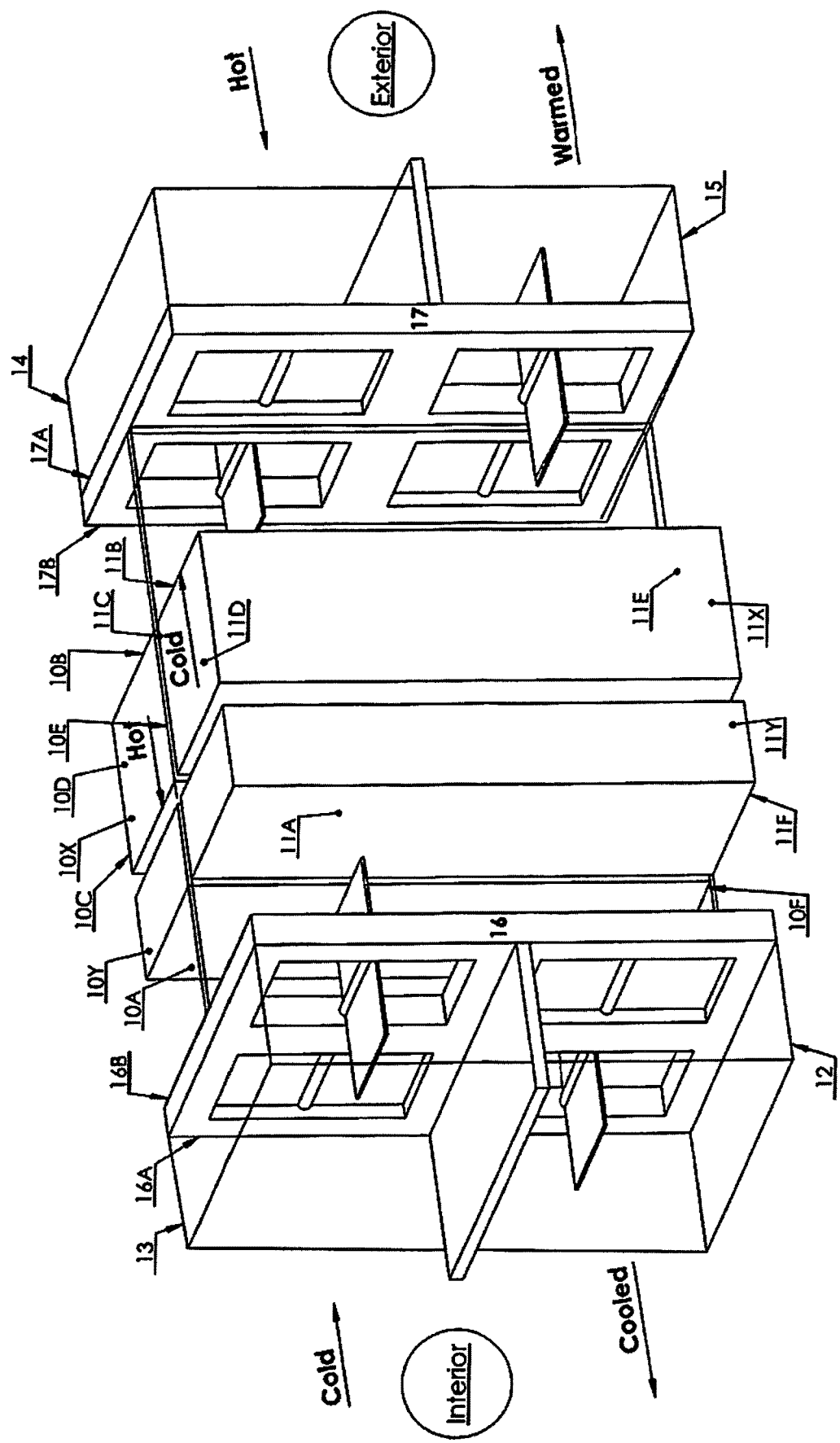

In a second mode of the cooling operation shown in FIG. 5 the interior air flow is switched by the first air control module to pass from the second airflow passageway through the second energy absorbing body and is switched by the second air control module to pass to the fourth airflow passageway to the exterior to store cold thermal energy in the second energy absorbing body while the exterior air flow does not pass through the second energy absorbing body but instead passes through the third airflow passageway and is switched by the second air control module to pass through the first energy absorbing body and is switched by the first air control module to pass to the interior through the first airflow passageway while being cooled and/or dehumidified by the cold thermal energy stored in the first energy absorbing body which has been cooled and/or dehumidified in the first mode.

Figure 6:
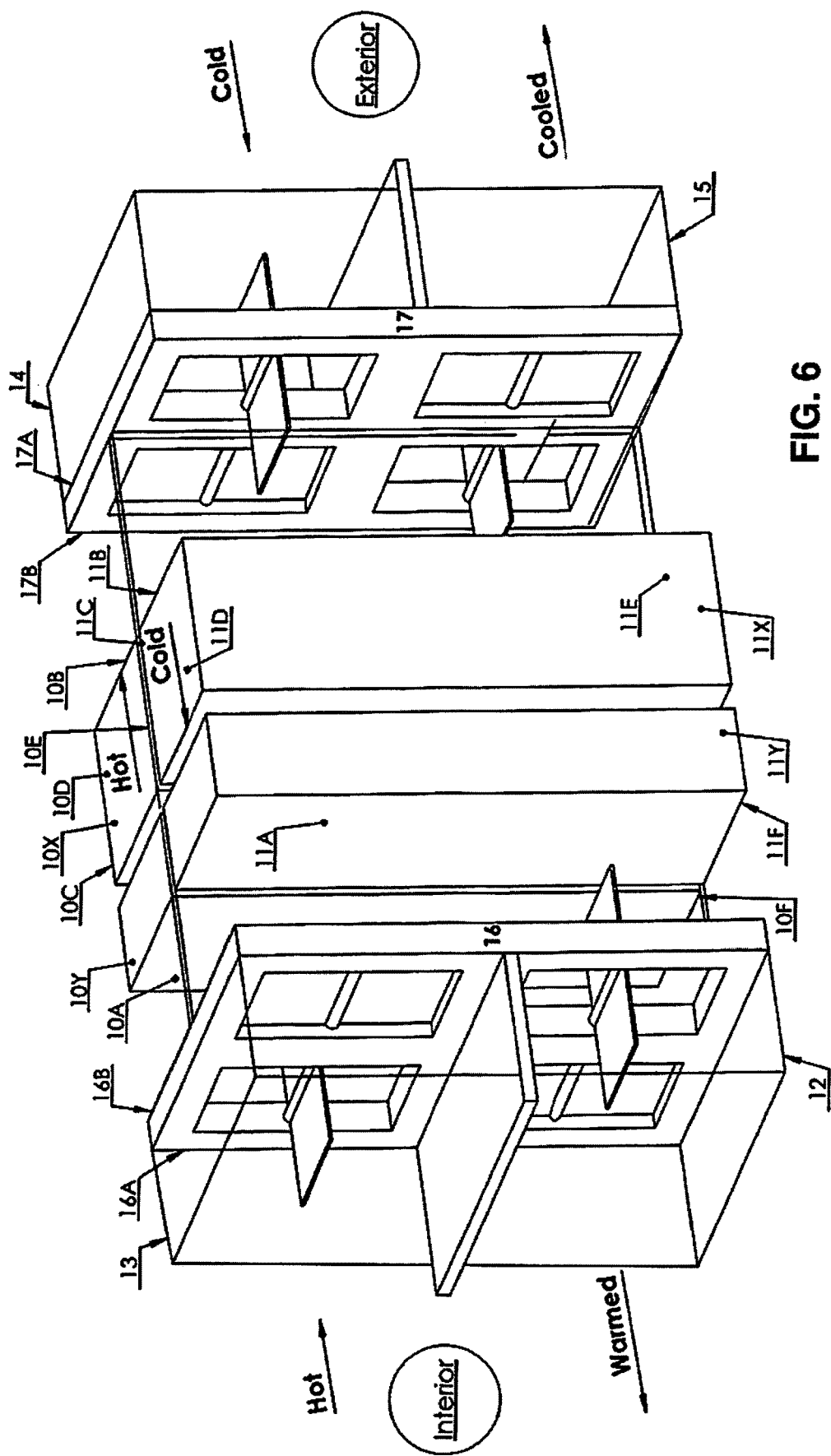

In a first mode of the heating operation shown in FIG. 6 the interior air flow is switched by the first air control module to pass from the second airflow passageway through the first energy absorbing body and is switched by the second air control module to pass to the fourth airflow passageway to the exterior to store hot thermal energy in the first energy absorbing body while the exterior air flow does not pass through the first energy absorbing body but instead passes through the third airflow passageway and is switched by the second air control module to pass through the second energy absorbing body and is switched by the first air control module to pass to the interior through the first airflow passageway.

Figure 7:
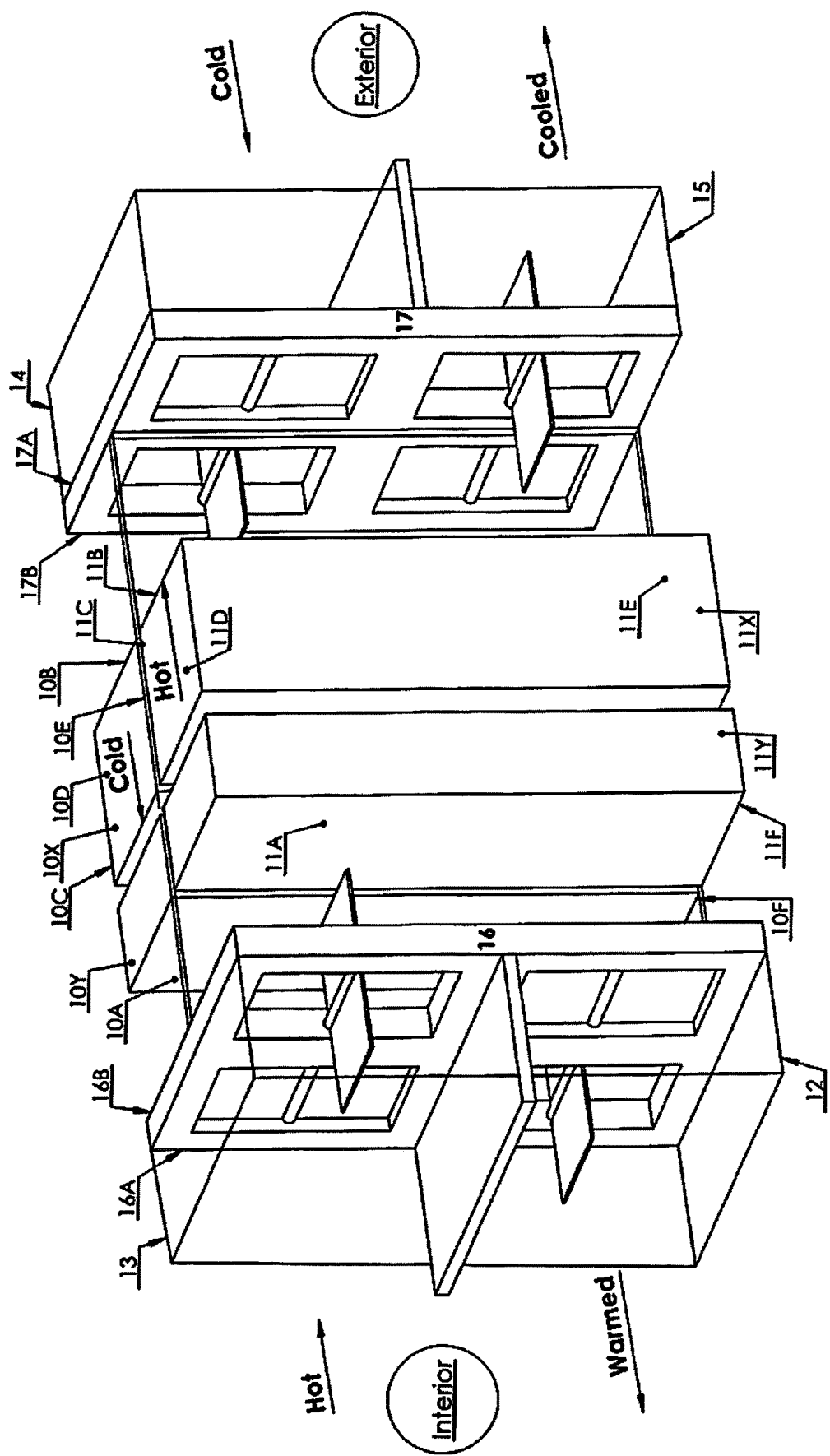

In a second mode of the heating operation shown in FIG. 7 the interior air flow is switched by the first air control module to pass from the second airflow passageway through the second energy absorbing body and is switched by the second air control module to pass to the fourth airflow passageway to the exterior to store hot thermal energy in the second energy absorbing body while the exterior air flow does not pass through the second energy absorbing body but instead passes through the third airflow passageway and is switched by the second air control module to pass through the first energy absorbing body and is switched by the first air control module to pass to the interior through the first airflow passageway while being heated and/or humidified by the hot thermal energy stored in first energy absorbing body which has been heated and/or humidified in the first mode.

Passageways 12 and 13 are each rectangular and one side (bottom of passageway 13 and top of passageway 12) lying parallel and adjacent. Passageways 14 and 15 are each rectangular and one side (bottom of passageway 14 and top of passageway 15) lying parallel and adjacent. Passageways 12 and 13 are located at the end 16A of the module 16 and face in a common direction and Passageways 14 and 15 are located at the end 17A of the module 17 and face in a common direction away from passageways 12 and 13. Passage faces 10A and 11A lie in a common plane and passage faces 10B and 11B lie in a common plane. The passageways 12, 13, 14, and 15, the modules 16 and 17 and the bodies 10 and 11 form a common assembly as shown in Appendix A.

As shown in FIG. 1, each of the bodies is separated into two portions 10X and 10Y and 11X, 11Y with the second portions 10X and 11X which are free from the absorbent material being located on the end 10B, 11B of the bodies so as to be at the outside air end.

Figure 9:
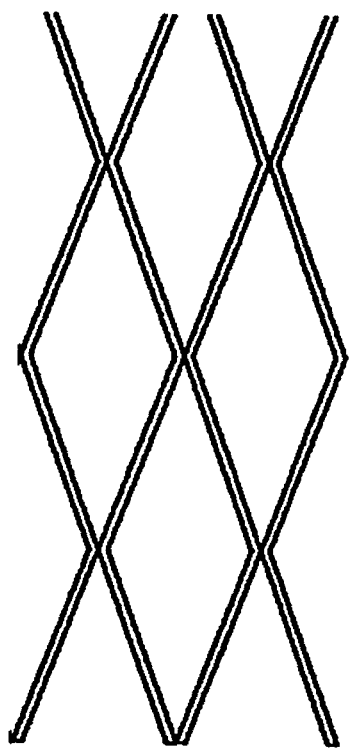
FIG. 9 is a cross-sectional view through one of the sensible energy absorbing bodies showing the passageways through which the air passes.
Figure 11:
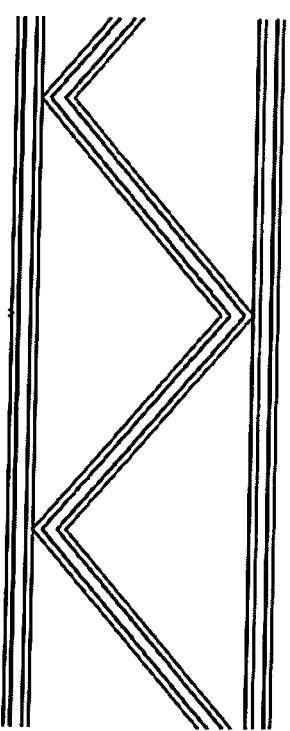
FIG. 11 is a cross-sectional view through one of the latent energy absorbing bodies on an enlarged scale showing more clearly the presence of the absorbent layers on the supporting sheet.

As shown in FIG. 9, the second portion contains no moisture absorbent material in that the body is formed of aluminum sheets which are bare and contain no absorbent layer.

As shown in FIG. 1, the first and second portions are separate components arranged directly end to end and have a common face therebetween of common dimensions through which air departing one portion enters the other portion.

Figure 10:
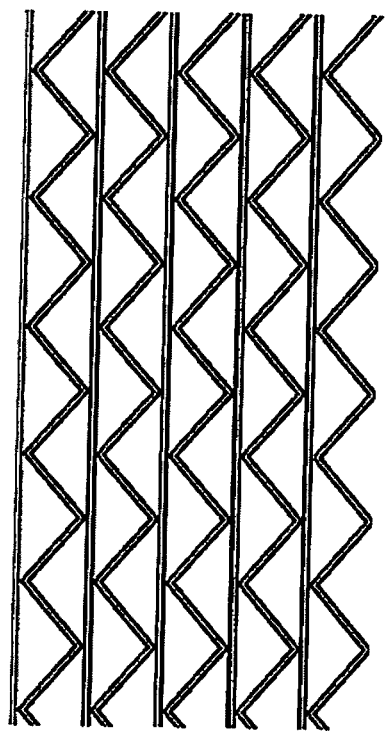
FIG. 10 is a cross-sectional view through one of the latent energy absorbing bodies showing the passageways through which the air passes, with FIGS. 8 and 9 being shown in the same scale to show the difference in dimensions of the passageways.

As shown in FIGS. 9 and 10, the first portion 10Y, 11Y comprises sheets of a supporting material coated on both surfaces by a moisture absorbent material and the second portion is formed of sheets of a supporting material which carries no moisture absorbent material.

As shown by comparing FIGS. 9 and 10, the sheets of the first portion are arranged to define passages which are smaller in cross section than those of the second portion.

As shown in FIG. 1, the first portion has a volume which is smaller than that of the second portion where the first portion has a cross-sectional area which is equal to that of the second portion and an air path length through the body which is shorter.

While the structure shown has the bodies side by side with the switching modules directly at the ends, other constructions can be provided with different air flow paths. While the bodies are formed with the portions end to end, this is not essential and the structure may be formed of four separate components 10X, 10Y, 11X and 11Y which are at separate locations and connected by duct work.

As shown in FIG. 1, the air from the second and third airflow passageway is filtered upstream of each of the first portions 10Y, 11Y of each energy absorbing body by a filter 18, 19 to prevent erosion, contamination, and blockage of the moisture absorbent material so that the exterior airflow pulled from the exterior is filtered before entering either one of the energy adsorbing body and the interior air from the building is filtered before entering the first portion and being expelled to the exterior.

Also as shown in FIG. 8 arrangements with air reversal in the third and fourth passageway are fitted with a bi-directional air filter 20, 21 between the first and second portion of each energy absorbing body to remove dust particles and contaminants from the exterior air flow before entering the first portion.

The units in FIG. 12-15 are alternate air flow and energy exchanger arrangements, but still show the same energy exchanger design. The sensible portion 10X, 11X is always in contact with the exterior, the latent portion 10Y, 11Y is in contact with the interior, and optional filters 20 and 21 are sandwiched between the two portions. For ease of understanding of the different air flows, only one air flow control module 16 is shown, but all units can be configured with a second air flow control module to make them dedicated path air flow. The components described above use the same reference numbers to identify components in the FIGS. 12 to 15 which operate in the same manner. These arrangements all operate in a similar manner but the different configurations have different characteristics for use in different air flow conditions.

Figure 12:
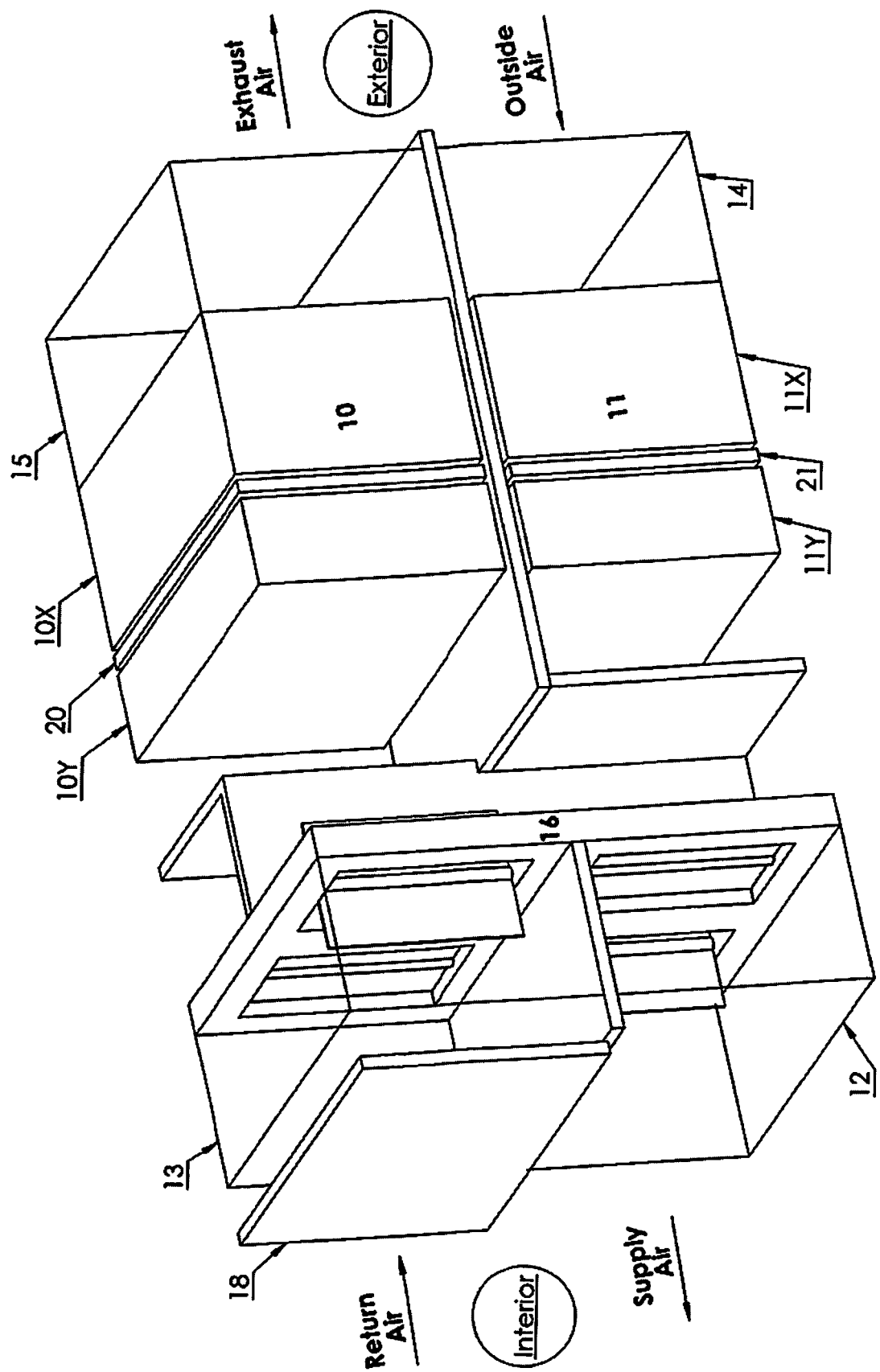
FIG. 12 is a perspective view of a ventilation device according to a further example of the present invention, with parts of the housing cut open for visibility. This arrangement shows an arrangement with the energy absorbing bodies stacked with one air flow control module at one end of the stacked assembly.

FIG. 12 is a perspective view of a ventilation device according to a further example of the present invention, with parts of the housing cut open for visibility. This arrangement shows an arrangement with the energy absorbing bodies stacked with one air flow control module at one end of the stacked assembly.

Figure 13:
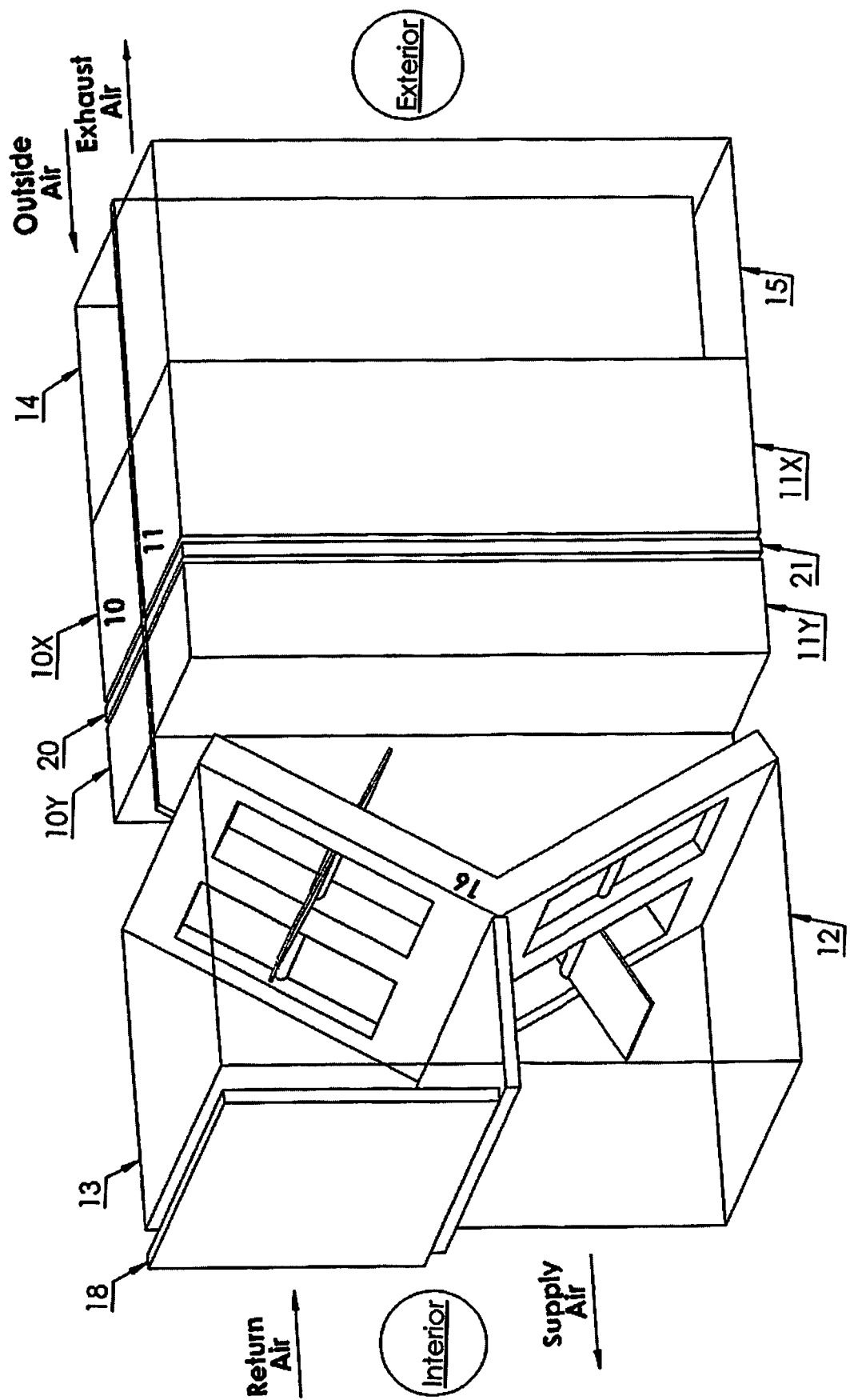
FIG. 13 is a perspective view of a ventilation device according to a further example of the present invention, with parts of the housing cut open for visibility. This arrangement shows an arrangement similar to that of FIG. 12 with the energy absorbing bodies stacked with a modified arrangement of air flow control module at one end of the stacked assembly.

FIG. 13 is a perspective view of a ventilation device according to a further example of the present invention, with parts of the housing cut open for visibility. This arrangement shows an arrangement similar to that of FIG. 12 with the energy absorbing bodies stacked with a modified arrangement of air flow control module at one end of the stacked assembly.

Figure 14:
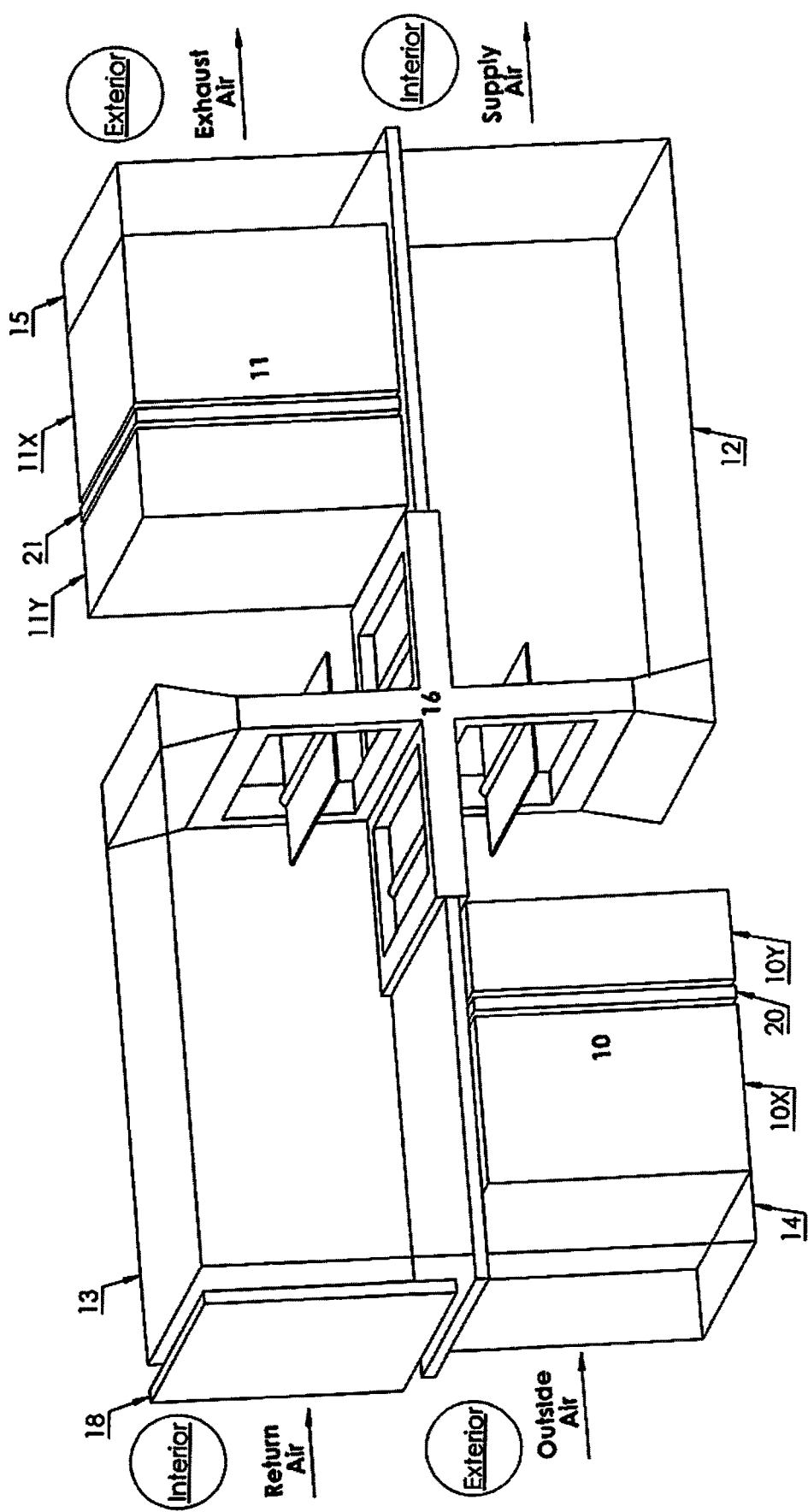
FIG. 14 is a perspective view of a ventilation device according to a further example of the present invention, with parts of the housing cut open for visibility. This arrangement shows the energy absorbing bodies at opposite ends.

FIG. 14 is a perspective view of a ventilation device according to a further example of the present invention, with parts of the housing cut open for visibility. This arrangement shows the energy absorbing bodies at opposite ends.

Figure 15:
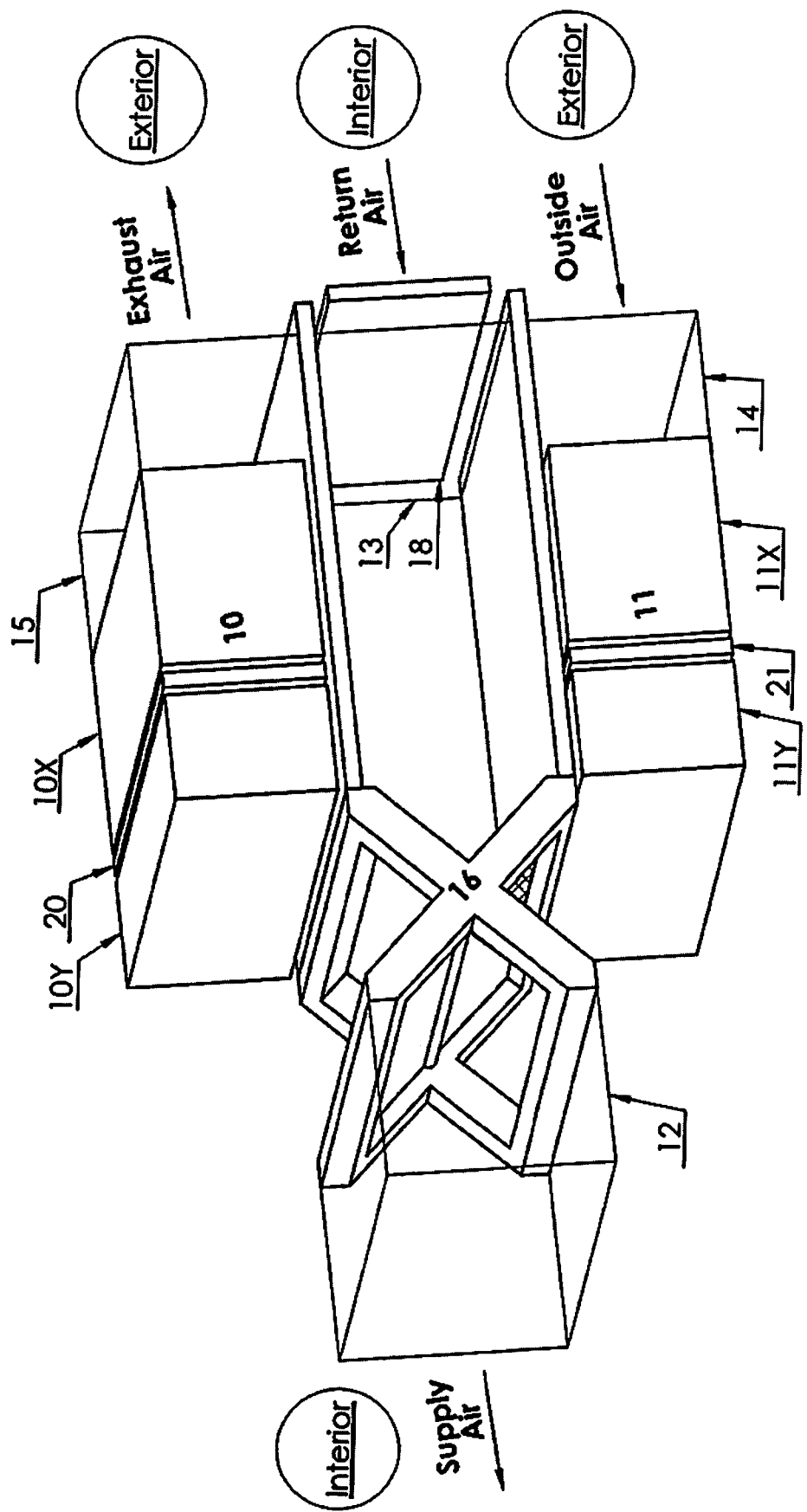
FIG. 15 is a perspective view of a ventilation device according to a further example of the present invention, with parts of the housing cut open for visibility. This arrangement shows a compact arrangement with modified air flow control module for applications with lower air flow rates.

FIG. 15 is a perspective view of a ventilation device according to a further example of the present invention, with parts of the housing cut open for visibility. This arrangement shows a compact arrangement with modified air flow control module for applications with lower air flow rates.

The invention claimed is:

1. A ventilation apparatus for connection between an exterior and an interior of a structure, such as a building or other construction where air of different temperatures and humidities are located on the interior and exterior, where the apparatus is arranged to operate:

in a cooling operation, when air in the exterior is hotter and/or more humid than air in the interior, energy and moisture extracted from an exterior air flow passing from the exterior to the interior to cool and dehumidify the exterior air flow passing to the interior; and in a heating operation, when the exterior air is cooler and/or dryer than the interior air, energy is extracted from an interior air flow passing to the exterior from the interior to heat and/or humidify the exterior air flow passing to the interior;

the apparatus comprising:

a first energy absorbing body and a second energy absorbing body;

a first airflow passageway for connection to the interior of the building so that an airflow can pass therethrough to introduce exterior air into the building;

a second airflow passageway for connection to the interior of the building so that an airflow can pass therethrough to extract interior air from the building;

a third airflow passageway for connection to the exterior of the building so that an airflow can pass therethrough to pull exterior air into the building; and a fourth airflow passageway for connection to the exterior of the building so that an airflow can pass therethrough to expel interior air out of the building;

the first and second energy absorbing bodies being arranged so as to:

a) transfer thermal energy to the energy absorbing body from air passing through the energy absorbing body when a temperature and/or humidity of the air is higher than the energy absorbing body so as to store hot thermal energy in the energy absorbing body; and b) transfer thermal energy from the energy absorbing body to the air passing through the energy absorbing body when a temperature and/or humidity of the air is lower than the energy absorbing body so as to store cold thermal energy in the energy absorbing body; and an air control system is provided to switch the air flows between the first and second energy absorbing bodies so that:

in the cooling operation in a first mode the interior air flow passes through the first energy absorbing body to the exterior to store cold thermal energy in the first energy absorbing body while the exterior air flow does not pass through the first energy absorbing body but instead it passes through the second energy absorbing body to the interior and in a second mode the interior air flow passes through the second energy absorbing body to the exterior to store cold thermal energy in the second energy absorbing body while the exterior air flow does not pass through the second energy absorbing body but instead passes through the first energy absorbing body to the interior while being cooled by the cold thermal energy stored in the first energy absorbing body which has been cooled in the first mode;

in the cooling operation in a first mode the exterior air flow passes through the first energy absorbing body to the interior to store moisture in the first energy absorbing body while the interior air flow does not pass through the first energy absorbing body but instead it passes through the second energy absorbing body to the exterior and in a second mode the exterior air flow passes through the second energy absorbing body to the interior to store moisture in the second energy absorbing body while the interior air flow does not pass through the second energy absorbing body but instead passes through the first energy absorbing body to the exterior while carrying to the exterior moisture stored in the first energy absorbing body in the first mode;

in the heating operation the air flows between the first and second energy absorbing bodies so that, in a first mode of the heating operation, interior air flow passes through the first energy absorbing body to the exterior to store hot thermal energy in the first energy absorbing body while the exterior air flow does not pass through the first energy absorbing body but instead passes through the second energy absorbing body to the interior; and, in a second mode of the heating operation, the interior air flow passes through the second energy absorbing body to the exterior to store hot thermal energy in the second energy absorbing body while the exterior air flow does not pass through the second energy absorbing body but instead passes through the first energy absorbing body to the interior while being heated by the hot thermal energy stored in first energy absorbing body which has been heated and/or humidified in the first mode;

wherein each of the first and second energy absorbing bodies includes a plurality of passages extending through the body along which the air in the body passes;

wherein each of the first and second energy absorbing bodies has the passages therethrough divided into first latent energy portions of the passages each of which includes a moisture absorbent material so that it is arranged to absorb moisture and second sensible energy recovery portions of the passages which are substantially free from moisture absorbent material so as to absorb primarily sensible energy.

2. The ventilation apparatus according to claim 1 wherein the first and second portions of the passages are arranged directly end to end.

3. The ventilation apparatus according to claim 1 wherein the first and second portions of the passages are defined in first and second portions of the bodies which have a common face of the bodies therebetween of common dimensions through which air departing one portion of the body enters the other portion of the body.

4. The ventilation apparatus according to claim 1 wherein the first portion of the passages comprises sheets of a supporting material coated on both surfaces by a moisture absorbent material and the second portion of the passages is formed of sheets of a supporting material which carries no moisture absorbent material.

5. The ventilation apparatus according to claim 1 wherein the first and second portions of the passages are defined in first and second portions of the bodies wherein the first portion of the body has a volume which is smaller than that of the second portion of the body.

6. The ventilation apparatus according to claim 5 wherein the first portion of the body has a cross-sectional area which is equal to that of the second portion of the body and a path length along the passages of the first portion of the body which is shorter than a path length along the passages of the second portion of the body.

7. The ventilation apparatus according to claim 1 wherein the first and second airflow passageways are rectangular with four sides with one side of the first airflow passageway lying parallel and adjacent to one side of the second airflow passageway and wherein the third and fourth airflow passageways are rectangular with four sides with one side of the third airflow passageway lying parallel and adjacent to one side of the fourth airflow passageway.

8. The ventilation apparatus according to claim 1 wherein the air control system comprises first and second air control modules and wherein the first and second airflow passageways face in a common direction at a first end of the first air control module, and the third and fourth airflow passageways face in a common direction away from the first and second airflow passageways at a first end of the second air control module.

9. The ventilation apparatus according to claim 1 wherein the first and second energy absorbing bodies are stacked one on top of the other.

10. The ventilation apparatus according to claim 1 wherein the first, second, third and fourth passageways, the air control system and the first and second energy absorbing bodies are formed as a common assembly for common installation in the building for attachment to interior and exterior ducts within the building.

11. The ventilation apparatus according to claim 1 wherein the air from the second and third airflow passageway is filtered upstream of the first portion of the passages of each energy absorbing body to prevent erosion, contamination, and blockage of the moisture absorbent material so that the exterior airflow pulled from the exterior is filtered before entering either one of the energy adsorbing bodies and the interior air from the building is filtered before entering the first portion of the passages and being expelled to the exterior.

12. The ventilation apparatus according to claim 1 wherein arrangements with air reversal in the third and fourth passageway are fitted with a bi-directional air filter between the first and second portion of the passages of each energy absorbing body to remove dust particles and contaminants from the exterior air flow before entering the first portion of the passages.

13. A ventilation apparatus for connection between an exterior and an interior of a structure, such as a building or other construction where air of different temperatures and humidities are located on the interior and exterior, where the apparatus is arranged to operate:

in a cooling operation, when air in the exterior is hotter and/or more humid than air in the interior, energy and moisture extracted from an exterior air flow passing from the exterior to the interior to cool and dehumidify the exterior air flow passing to the interior; and in a heating operation, when the exterior air is cooler and/or dryer than the interior air, energy is extracted from an interior air flow passing to the exterior from the interior to heat and/or humidify the exterior air flow passing to the interior;

the apparatus comprising:

a first energy absorbing body and a second energy absorbing body;

a first airflow passageway for connection to the interior of the building so that an airflow can pass therethrough to introduce exterior air into the building;

a second airflow passageway for connection to the interior of the building so that an airflow can pass therethrough to extract interior air from the building;

a third airflow passageway for connection to the exterior of the building so that an airflow can pass therethrough to pull exterior air into the building; and a fourth airflow passageway for connection to the exterior of the building so that an airflow can pass therethrough to expel interior air out of the building;

the first and second energy absorbing bodies being arranged so as to:

a) transfer thermal energy to the energy absorbing body from air passing through the energy absorbing body when a temperature and/or humidity of the air is higher than the energy absorbing body so as to store hot thermal energy in the energy absorbing body; and b) transfer thermal energy from the energy absorbing body to the air passing through the energy absorbing body when a temperature and/or humidity of the air is lower than the energy absorbing body so as to store cold thermal energy in the energy absorbing body; and an air control system is provided to switch the air flows between the first and second energy absorbing bodies so that:

in the cooling operation in a first mode the interior air flow passes through the first energy absorbing body to the exterior to store cold thermal energy in the first energy absorbing body while the exterior air flow does not pass through the first energy absorbing body but instead is passes through the second energy absorbing body to the interior and in a second mode the interior air flow passes through the second energy absorbing body to the exterior to store cold thermal energy in the second energy absorbing body while the exterior air flow does not pass through the second energy absorbing body but instead passes through the first energy absorbing body to the interior while being cooled by the cold thermal energy stored in the first energy absorbing body which has been cooled in the first mode;

in the cooling operation in a first mode the exterior air flow passes through the first energy absorbing body to the interior to store moisture in the first energy absorbing body while the interior air flow does not pass through the first energy absorbing body but instead is passes through the second energy absorbing body to the exterior and in a second mode the exterior air flow passes through the second energy absorbing body to the interior to store moisture in the second energy absorbing body while the interior air flow does not pass through the second energy absorbing body but instead passes through the first energy absorbing body to the exterior while carrying to the exterior moisture stored in the first energy absorbing body in the first mode;

in the heating operation the air flows between the first and second energy absorbing bodies so that, in a first mode of the heating operation, interior air flow passes through the first energy absorbing body to the exterior to store hot thermal energy in the first energy absorbing body while the exterior air flow does not pass through the first energy absorbing body but instead passes through the second energy absorbing body to the interior; and, in a second mode of the heating operation, the interior air flow passes through the second energy absorbing body to the exterior to store hot thermal energy in the second energy absorbing body while the exterior air flow does not pass through the second energy absorbing body but instead passes through the first energy absorbing body to the interior while being heated by the hot thermal energy stored in first energy absorbing body which has been heated and/or humidified in the first mode;

wherein each of the first and second energy absorbing bodies includes a plurality of passages extending through the body along which the air in the body passes;

wherein each of the first and second energy absorbing bodies has the passages therethrough divided into first latent energy portions of the passages each of which includes a moisture absorbent material so that it is arranged to absorb moisture and second sensible energy recovery portions of the passages which are substantially free from moisture absorbent material so as to absorb primarily sensible energy;

wherein the first latent energy portions of the passages are formed by first sheets bent to define the first portions and the second sensible energy portions of the passages are formed by second sheets bent to define the second portions where the first portions defined by the first sheets are smaller in cross section than the second portions defined by the second sheets.

14. The ventilation apparatus according to claim 13 wherein the first portion of the passages comprises sheets of a supporting material coated on both surfaces by a moisture absorbent material and the second portion of the passages is formed of sheets of a supporting material which carries no moisture absorbent material.

15. The ventilation apparatus according to claim 13 wherein the first and second portions of the passages are defined in first and second portions of the bodies wherein the first portion of the body has a volume which is smaller than that of the second portion of the body.

16. The ventilation apparatus according to claim 15 wherein the first portion of the body has a cross-sectional area which is equal to that of the second portion of the body and a path length along the passages of the first portion of the body which is shorter than a path length along the passages of the second portion of the body.

17. The ventilation apparatus according to claim 13 wherein the first and second airflow passageways are rectangular with four sides with one side of the first airflow passageway lying parallel and adjacent to one side of the second airflow passageway and wherein the third and fourth airflow passageways are rectangular with four sides with one side of the third airflow passageway lying parallel and adjacent to one side of the fourth airflow passageway.

18. The ventilation apparatus according to claim 13 wherein the air control system comprises first and second air control modules and wherein the first and second airflow passageways face in a common direction at a first end of the first air control module, and the third and fourth airflow passageways face in a common direction away from the first and second airflow passageways at a first end of the second air control module.

19. The ventilation apparatus according to claim 13 wherein the first and second energy absorbing bodies are stacked one on top of the other.

20. The ventilation apparatus according to claim 13 wherein the first, second, third and fourth passageways, the air control system and the first and second energy absorbing bodies are formed as a common assembly for common installation in the building for attachment to interior and exterior ducts within the building.

* * * * *